United States Patent [19]
Lee

[11] Patent Number: 5,611,511
[45] Date of Patent: Mar. 18, 1997

[54] SUCKER STRUCTURE

[75] Inventor: Chun-yi Lee, Yungkang, Taiwan

[73] Assignee: Chien-shish Wu, Chiayi Hsien, Taiwan

[21] Appl. No.: 572,853

[22] Filed: Dec. 14, 1995

[51] Int. Cl.$^6$ ................................................ A45D 42/14
[52] U.S. Cl. .................................. 248/205.8; 248/205.5
[58] Field of Search .................. 248/205.5, 205.6, 248/205.7, 205.8, 205.9, 206.1, 206.2, 206.3, 206.4

[56] References Cited

U.S. PATENT DOCUMENTS

| | | | |
|---|---|---|---|
| 4,846,429 | 7/1989 | Scheurer et al. | 248/205.8 |
| 5,253,393 | 10/1993 | Levin | 248/205.5 X |
| 5,405,112 | 4/1995 | Tretheway | 248/205.8 |

*Primary Examiner*—Alvin C. Chin-Shue
*Assistant Examiner*—Gwendolyn Wrenn

[57] ABSTRACT

A sucker structure includes a disk body having a rim portion, a supporting base formed on an upper portion of the disk body, a flexible snapping member mounted on an upper portion of the supporting base, and a drawing strip having a first end portion attached to the rim portion of the disk body and a second end portion attached to one distal end of the snapping member.

3 Claims, 3 Drawing Sheets

5,611,511

SUCKER STRUCTURE

FIELD OF THE INVENTION

The present invention relates to a sucker structure.

BACKGROUND OF THE INVENTION

A conventional sucker with an article mounted thereon can be adapted to be adhered to a smooth surface such as a vertical wall or a glass surface, thereby fastening the sucker together with the article to the smooth surface. However, the sucker is firmly adhered on the smooth surface and thus is not easily removed from the smooth surface. The present invention has arisen to mitigate and/or obviate the disadvantage of the conventional sucker.

SUMMARY OF THE INVENTION

The primary objective of the present invention is to provide a sucker structure which can be firmly adhered on a smooth surface and can be easily removed therefrom. In accordance with one aspect of the present invention, there is provided a sucker structure comprising a disk body having a rim portion, a supporting base formed on an upper portion of the disk body, a flexible snapping member mounted on an upper portion of the supporting base, and a drawing strip having a first end portion attached to the rim portion of the disk body and a second end portion attached to one distal end of the snapping member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 1:
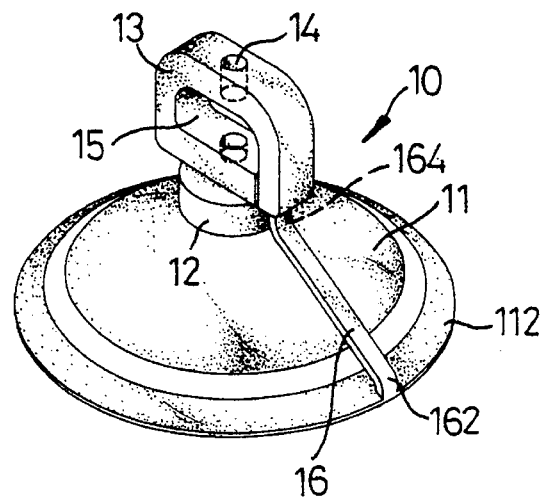
FIG. 1 is a perspective view of a sucker structure in accordance with a first embodiment of the present invention.

Referring to the drawings, and initially to FIG. 1, a sucker (or suction cup) structure 10 in accordance with a first embodiment of the present invention comprises a disk body 11 having a rim portion 112, a supporting base 12 formed on an upper portion of the disk body 11, a flexible snapping member 13 formed on an upper portion of the supporting base 12, and a drawing strip 16 having a first end portion 162 attached to the rim portion 112 of the disk body 11 and a second end portion 164 attached to one distal end 132 of the snapping member 13.

Preferably, the snapping member 13 includes an opening 15 transversely defined therethrough. In addition, the snapping member 13 further includes at least one bore 14 vertically defined therein.

Figure 2:
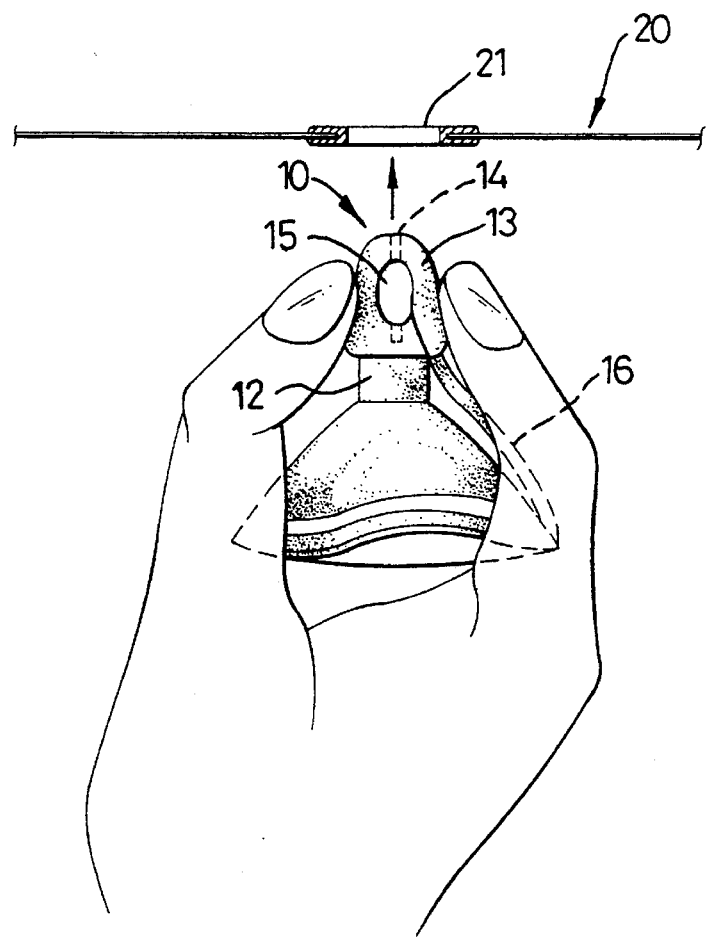
FIG. 2 is an operational view of FIG. 1.
Figure 3:
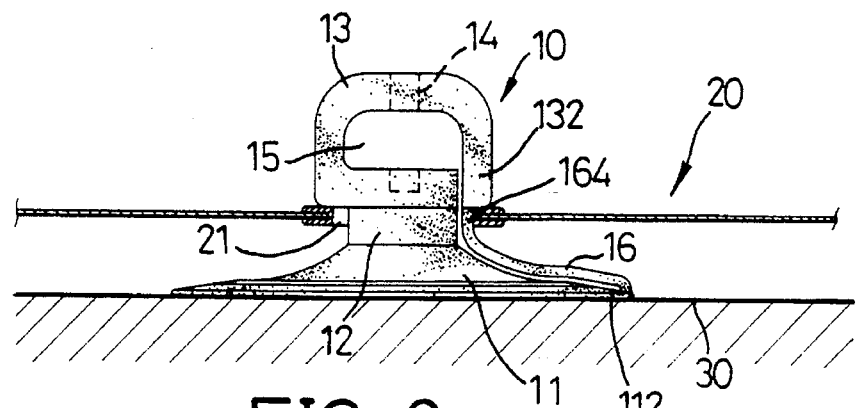
FIG. 3 is a front plan assembly view of FIG. 1.
Figure 4:
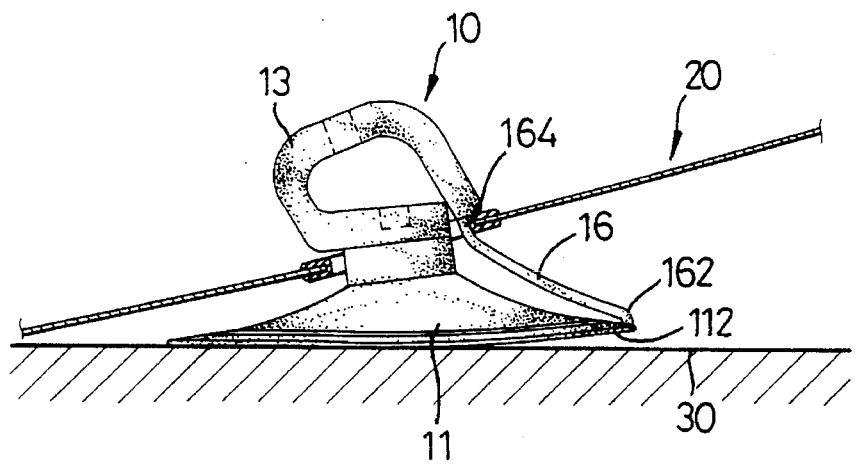
FIG. 4 is an operational view of FIG. 3.

In operation, referring to FIGS. 2–4 with reference to FIG. 1, the snapping member 13 can be compressed inwardly as shown in FIG. 2 to pass through a hole 21 defined in an article 20 and extend outwards of the hole 21 such that the supporting base 12 can be received in the hole 21 of the article 20 as shown in FIG. 3 with the snapping member 13 projecting outwards of the article 20.

Then, the disk body 11 of the sucker structure 10 can be adapted to be adhered and secured to a smooth surface 30 such as a wall or a glass, thereby fastening the sucker structure 10 together with the article 20 to the smooth surface 30.

On the contrary, the snapping member 13 can be drawn outwardly relative to the smooth surface 30, thereby synchronously forcing the first end portion 162 of the drawing strip 16 together with the rim portion 112 of the disk body 11 to be detached from the smooth surface 30 as shown in FIG. 4 such that the sucker structure 10 together with the article 20 can be easily removed from the smooth surface 30.

Figure 5:
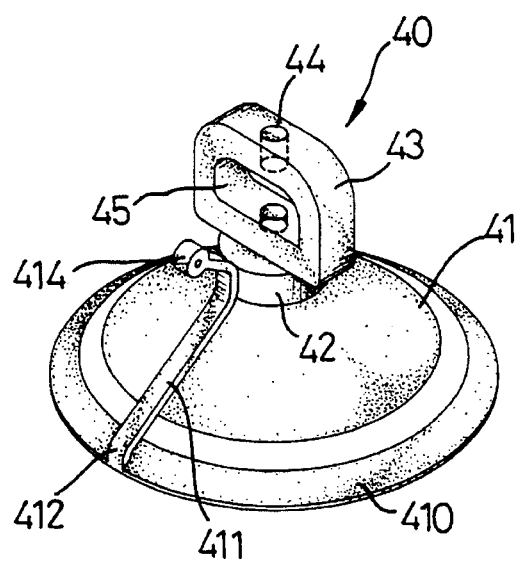
FIG. 5 is a perspective view of a sucker structure according to a second embodiment of the present invention.

Referring to FIG. 5, a sucker structure 40 in accordance with a second embodiment of the present invention comprises a disk body 41 having a rim portion 410, a supporting base 42 formed on an upper portion of the disk body 41, a flexible snapping member 43 formed on an upper portion of the supporting base 42, and a drawing strip 411 having a first end portion 412 attached to the rim portion 410 of the disk body 41 and a second end portion 414 disposed adjacent to the snapping member 43.

Preferably, the snapping member 43 includes an opening 45 transversely defined therethrough and at least one bore 44 vertically defined therein.

The operation is similar to that of the first embodiment as shown in FIGS. 1–4, the second end portion 414 of the drawing strip 411 and the snapping member 43 are both disposed outwards of a hole of an article such that the second end portion 414 of the drawing strip 411 can be pulled outwardly relative to a smooth surface, thereby synchronously forcing the first end portion 412 of the drawing strip 411 together with the rim portion 410 of the disk body 41 to be detached from the smooth surface such that the sucker structure 40 together with the article can be easily removed from the smooth surface.

Figure 6:
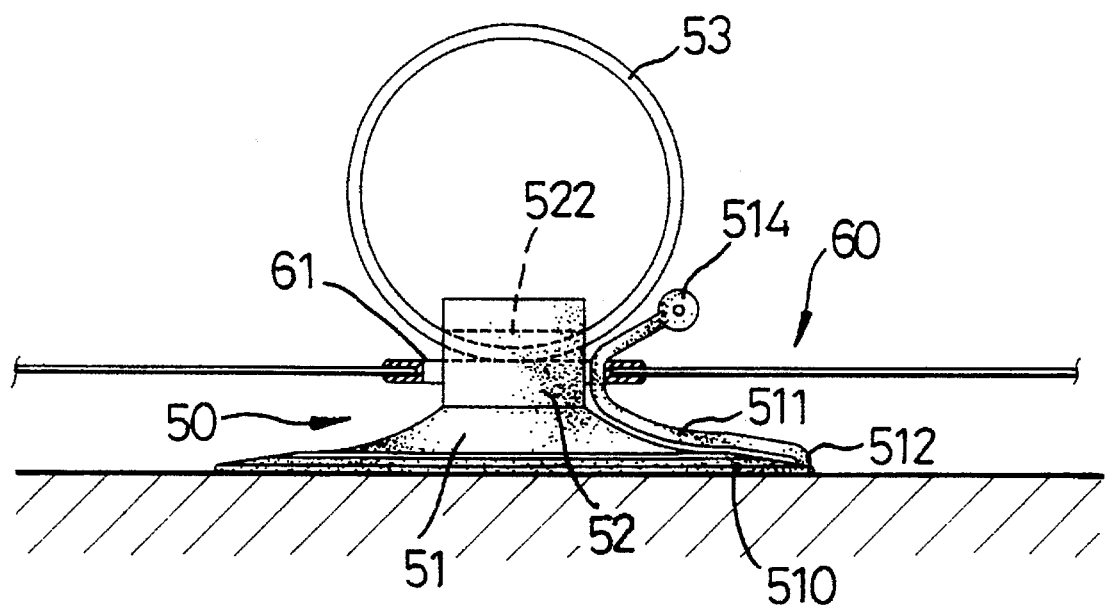
FIG. 6 is a front plan view of a sucker structure in accordance with a third embodiment of the present invention.

Referring to FIG. 6, a sucker structure 50 in accordance with a third embodiment of the present invention comprises a disk body 51 having a rim portion 510, a supporting base 52 formed on an upper portion of the disk body 51, a flexible snapping ring 53 engaged in a hole 522 transversely defined in an upper portion of the supporting base 52 and disposed outward of a passage 61 vertically defined in an article 60, and a drawing strip 511 having a first end portion 512 attached to the rim portion 510 of the disk body 51 and a second end portion 514 located adjacent to the snapping ring 53 and disposed outward of the passage 61 of the article 60.

The operation is similar to that as described in the above embodiments and will not be further illustrated in details.

It should be clear to those skilled in the art that further embodiments of the present invention may be made without departing from the scope and spirit of the present invention.

What is claimed is:

1. A sucker structure comprising a disk body having a rim portion, a supporting base formed on an upper portion of said disk body, a flexible snapping member fixedly mounted on an upper portion of said supporting base, and a drawing strip having a first end portion fixedly attached to said rim portion of said disk body and a second end portion disposed adjacent to said flexible snapping member wherein said flexible snapping member and said supporting base are integrally joined.

2. The sucker structure in accordance with claim 1, wherein said flexible snapping member includes an opening transversely defined therethrough.

3. The sucker structure in accordance with claim 1, wherein said flexible snapping member includes at least one bore vertically defined therein.

* * * * *